United States Patent [19]

Battle

[11] Patent Number: 4,753,501

[45] Date of Patent: Jun. 28, 1988

[54] FIBER OPTIC ROTARY SWITCHING DEVICE

[75] Inventor: Stanley D. Battle, San Diego, Calif.

[73] Assignee: The United States of America as represented by the Secretary of the Air Force, Washington, D.C.

[21] Appl. No.: 818,922

[22] Filed: Jan. 15, 1986

[51] Int. Cl.[4] ............................................... G02B 6/36
[52] U.S. Cl. ................................ 350/96.20; 350/96.10
[58] Field of Search ........................... 350/96.10, 96.20

[56] References Cited

U.S. PATENT DOCUMENTS

| | | | |
|---|---|---|---|
| 3,688,636 | 9/1972 | Spiess et al. | 89/1.8 |
| 4,047,483 | 9/1977 | Williams | 102/70.2 A |
| 4,278,026 | 7/1981 | Hibbs et al. | 102/254 |
| 4,346,658 | 8/1982 | Hibbs et al. | 102/254 |
| 4,489,656 | 12/1984 | Hennings et al. | 102/254 |
| 4,512,627 | 4/1985 | Archer et al. | 350/96.20 |
| 4,556,280 | 12/1985 | Bagby | 350/96.20 X |

FOREIGN PATENT DOCUMENTS 2820433 11/1978 Fed. Rep. of Germany ... 350/96.20

0004103 1/1981 Japan ........................... 350/96.13

OTHER PUBLICATIONS

"Optical Fiber Switch" by Sassen, IBM Technical Disclosure Bulletin" vol. 25, No. 7A, Dec. 1982.
"Fiber Optic Probe Actuate Switch" by Johnson, IBM Technical Disclosure Bulletin, vol. 15, No. 5, Oct. 1972.

*Primary Examiner*—William L. Sikes
*Assistant Examiner*—Akm E. Ullah
*Attorney, Agent, or Firm*—Jacob N. Erlich; Donald J. Singer

[57] ABSTRACT

A fiber optic rotary switching device having a single optical fiber rotatable between a plurality of optical fibers. The arrangement for rotating the single optical fiber is designed such that the single optical fiber flexes but does not twist with respect to an end thereof which is fixed to a light source (or, in the alternative to a light detector). As a result, the switching device switches light passing through the single optical fiber to a preselected one of the plurality of optical fibers while simultaneously preventing extraneous light from reaching the other optical fibers.

20 Claims, 1 Drawing Sheet

FIBER OPTIC ROTARY SWITCHING DEVICE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to fiber optic systems, and, more particularly, to a rotary switching device capable of selectively interconnecting a single optical fiber to a plurality of optical fibers.

Great strides are being made in the field of optical fiber systems such that their world wide usage in numerous different optical applications is becoming commonplace. There are a number of features that will attract different types of users to the incorporation of a wide variety of optical fibers within varying optical systems.

Optical fibers are extremely valuable in use where electromagnetic interference is a severe problem such as aboard ships, aircrafts or vehicles having sensitive electronic systems packaged along side electrical power systems. Furthermore, optical fibers have the potential for extremely wide band transmission with a bandwidth potential of several gigahertz over 1 km and hundreds of megahertz over distances of up to 10 km without intervening electronics. Additionally, optical fibers are acceptable for transmission of more modest bandwidths over very long continuous lengths of, for example, a few megahertz over 20 km. By comparison to the losses associated with coaxial cables optical fibers are not only becoming more desirable in many applications but also practically indispensible. The use of optical fibers within telecommunications is becoming conventional, and the use of optical fibers in the areas of medicine, for example, have led to many important breakthroughs not only in diagnostic equipment, but also in surgical equipment.

In most instances, such optical fiber systems are utilized in conjunction with lasers. For example, it is highly desirable to transmit a single incoming beam of electromagnetic radiation selectively to a number of different receiving stations, or from a plurality of sources to a single receiver or detector. Such applications can be found in ordnance initiation, communications, medical procedures, and optical transmissions in confined areas such as space stations. In the past, most types of alternative interconnection systems were bulky, expensive and unreliable and therefore their usage was severely limited. It would therefore be highly desirable if an optical switch was available which could readily accommodate a large number of outputs while simultaneously be extremely compact, reliable, and inexpensive to fabricate.

SUMMARY OF THE INVENTION

The present invention overcomes the problems of past optical switches by providing a compact fiber optic rotary switching device capable of being incorporated in many of today's optical systems.

The present invention is in the form of a fiber optic rotary switching device which incorporates therein a rotating shutter capable of accepting a single input fiber. This input fiber is operably connected with the rotatable shutter by means of a floating ferrule such that the fiber is capable of being rotated to a number of different positions without twisting or damaging the fiber.

Situated adjacent the rotatable shutter is a housing having a face plate. The plate incorporates therein a plurality of output fibers which are aligned, respectively, to the single input fiber as the input fiber rotates to a variety of preselected positions. In addition, the design of the rotatable shutter prevents the passage of electromagnetic radiation (light) through all of the output fibers except the particular output fiber which is optically aligned with the input fiber. A conventional stepper motor is utilized with the rotatable shutter so as to rotate the shutter and the fiber associated therewith to the preselected position adjacent the desired output fiber.

In addition, the fiber optic rotary switching device of the present invention incorporates therein a position detecting system which allows an operator to be aware, at all times, of the exact position of the input fiber with respect to the output fibers. Consequently, the switching operation is constantly monitored. In an alternate embodiment of the present invention a plurality of inputs may be selectively aligned with a single output fiber.

The fiber optic rotating switching device of the present invention is preferably incorporated within an optical system having a source of electromagnetic radiation (light) such as a laser. One of the ends of the input fiber is connected to this source. In this manner the output from the laser is transmitted through the input fiber to one of a plurality of output fibers in a systematic and efficient manner.

It is therefore an object of this invention to provide a fiber optic rotary switching device which is capable of efficiently interconnecting a single input fiber to one of a plurality of output fibers.

It is another object of this invention to provide a fiber optic rotary switching device in which the single input fiber remains intact throughout the entire switching operation and consequently substantially increases the life span of the switching device.

It is a further object of this invention to provide a fiber optic rotary switching device which is capable of effectively interconnecting one of a plurality of input fibers to a single output fiber.

It is still a further object of this invention to provide a fiber optic rotary switching device in which it is capable to ascertain the exact position of the single fiber relative to the plurality of fibers at any time during the switching operation.

It is even a further object of this invention to provide a fiber optic rotary switching device which is economical to produce and which utilizes conventional, currently available components that lend themselves to standard mass producing manufacturing techniques.

For a better understanding of the present invention, together with other and further objects thereof, reference is now made to the following description taken in conjunction with the accompanying drawings and its scope will be pointed out in the appended claims.

DETAILED DESCRIPTION OF THE PREFERRED EMBODIMENTS

Figure 1:
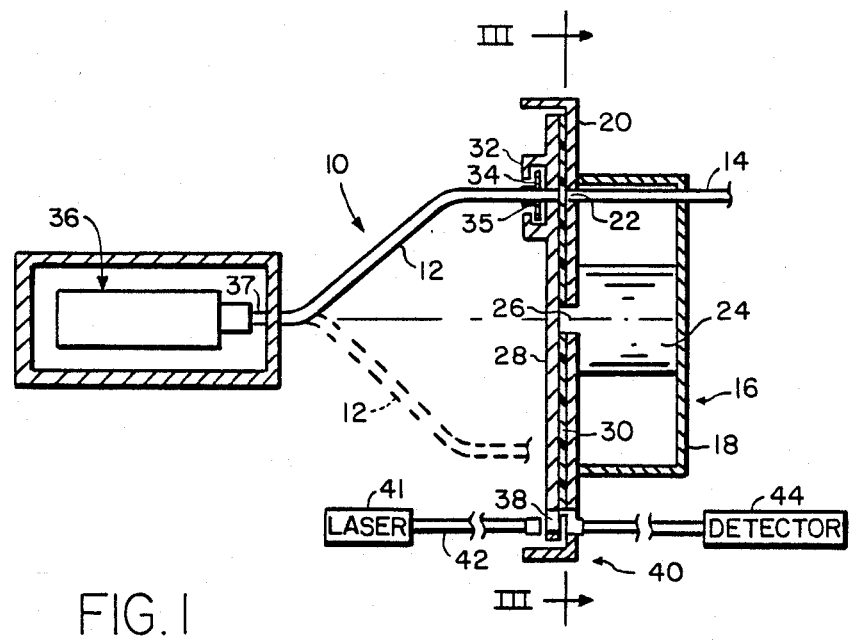
FIG. 1 is a side elevational view, shown partly in cross section, of the fiber optic rotary switching device of the present invention.

Reference is now made to FIG. 1 of the drawings which illustrates the fiber optic rotary switching device 10 of the present invention. Rotary switching device 10 has the capability of directing an incoming beam of electromagnetic radiation, preferably light, by means of input fiber 12 to any one of a plurality of output fibers 14 (only one of which is shown in the drawings). In addition thereto, the fiber optic rotary switching device 10 of the present invention is capable of blocking extraneous light to all of the other optical fibers. The device 10 eliminates the use of mirrors and provides an instantaneous readout of the position of the input fiber in a manner described in detail hereinbelow.

Figure 3:
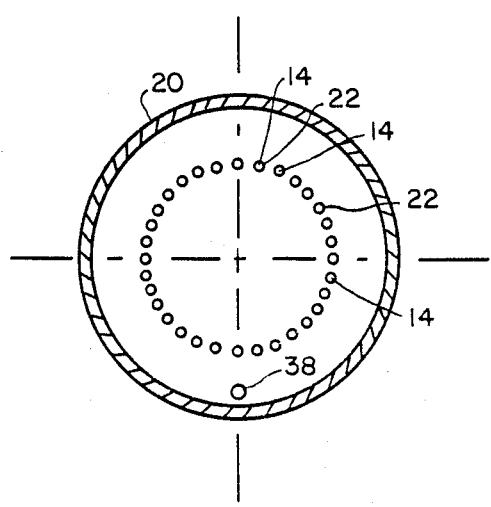
FIG. 3 is a cross sectional view taken along lines III—III of FIG. 1 illustrating the relative positions of the plurality of fibers of the fiber optic rotary switching device of the present invention.

More specifically, fiber optic rotary switching device 10 of the present invention is formed of a housing 16 having a frame-like construction made up of a motor containing section 18 and a face plate 20. As illustrated in FIGS. 1 and 3 of the drawings, face plate 20 has a plurality of openings 22 spaced apart from each other in a circular fashion, with each of the openings 22 having one of the plurality of optical fibers 14 affixed therein. In FIG. 3 of the drawings, thirty two such openings 22 and respective optical fibers 14 are illustrated, however, any number of optical fibers 14 and openings 22 may be used in the present invention.

Located within the motor containing section 18 is any conventional stepper motor 24 having a shaft 26 connected to a rotatable shutter 28. Interposed between rotatable shutter 28 and face plate 20 is any suitable gasket or sealing element 30 utilized to prevent extraneous light from entering the optical fibers 14 non-aligned with fiber 12. This sealing element 30 may be either secured to rotatable shutter 28 or to the external surface of the face plate 20. When secured to the external surface of face plate 20, sealing element or gasket 30 has a plurality of openings therein corresponding to and aligned with openings 22 in face plate 20. If the sealing element or gasket 30 is secured to the internal surface of rotatable element 28 then only one such opening is required, with this opening being aligned with input optical fiber 12 and rotatable with rotatable shutter 28. In any event, whether sealing element or gasket 30 is fixedly secured to rotatable shutter 28 or to face plate 20 it acts as a means for preventing extraneous light from entering all but the desired optical fiber 14.

Figure 2:
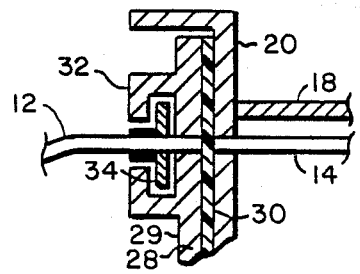
FIG. 2 is an enlarged, side elevational view of a portion of the fiber optic rotary switching device illustrating the interconnection of the single fiber to the rotatable shutter.

Reference is now made to FIGS. 1 and 2 of the drawings for a detailed description of the interconnection between input optical fiber 12 and rotatable shutter 28. As clearly shown in the enlarged view of FIG. 2, rotatable shutter 28 has located on its external surface 29 and juxtaposed the outer peripheral edge thereof a ferrule housing 32. Ferrule housing 32 is utilized to encompass a ferrule 34 to which is fixedly connected one end 35 of input optical fiber 12.

Ferrule 34 is floatingly positioned within ferrule housing 32 so that it is capable of moving freely therein. It is possible, under certain conditions, that any suitable ball bearing assembly (not shown) may be interposed between ferrule 34 and housing 32 in order to reduce friction between ferrule 34 and housing 32. Alternatively, the inner walls of housing 32 and the outer surface of ferrule 34 may be coated within any suitable substance to reduce friction such as Teflon.

As shown in FIG. 1 of the drawings the other end 37 of input optical fiber 12 is interconnected to any suitable source of electromagnetic radiation (light source) such as laser 36. Consequently, as the rotatable shutter 28 is rotated by means of stepper motor 24, input fiber 12 is flexed to a variety of positions as illustrated by the dotted lines in FIG. 1 but is not twisted to cause breakage thereof. In this manner, rotation of shutter 28 causes input optical fiber 12 to be aligned with any preselected one of the plurality of output optical fibers 14 while the remaining output optical fibers 14 remain blocked to stray light.

Once again referring to FIG. 1 of the drawings, it is necessary under certain circumstances to determine at all times the exact position of rotatable shutter 28. In so doing it is possible to ascertain to which output fiber 14 the input fiber 12 is optically aligned. In order to make this position determination, a position sensing or monitoring system 40 is incorporated within switching device 10. More specifically, the outer periphery of rotatable shutter 28 contains a series of openings 38 therein, with each of the openings 38 having a specific different configuration. The different configurations are utilized to denote the exact position of rotating shutter 28 with respect to the plurality of output fibers 14. Any suitable light source such as laser 44 provides a beam of light directed by an optical fiber 42 to pass through the openings 38. The light which passes through openings 38 is detected by any conventional detector 44 such as a photodiode in order to provide a signal representative of the exact position of rotatable shutter 28 with respect to output fibers 14. Consequently, at any particular time during rotation of shutter 28 and at any particular positioning of input fiber 12 with respect to output fibers 14 it is possible to determine through which particular output fiber 14 the input light is being passed.

Based upon the above description of the invention it is possible to provide a fiber optic rotary switching device capable of transmitting a single beam of light to any one of a plurality of output fibers 14. Consequently, a single light source such as laser 36 can be utilized in conjunction with a plurality of output optical fibers 14.

In the alternative, switching device 10 may be slightly modified by replacing light source (laser) 36 with a light detector and provide a plurality of light sources (lasers) to input light through the plurality of fibers 14, respectively. In this manner, at any time, one of a plurality of incoming beams of light passing through optical fibers 14 by way of a plurality of light sources (not shown) can be detected. By the use of position sensing system 40 associated with switching device 10, it is possible at all times to determine the exact position of rotatable shutter 28. Therefore, it is possible to determine which one of the plurality of optical fibers 14 is aligned with optical fiber 12. Still referring to the modified version of switching device 10 if, for example, the sixth one of the plurality of optical fibers 14 has an incoming beam passing therethrough which is to be detected by the single detector associated with optical fiber 12, one merely has to position rotating shutter 28 so that optical fiber 12 is optically aligned with this particular sixth optical fiber 14. Consequently, a plurality of detectors are unnecessary in such as system since it is feasible to use a single detector in conjunction with a single optical fiber 12 to accommodate light from a plurality of optical fibers 14.

In either case, whether the fiber optic rotary switching device 10 of the present invention is used as a means for passing light from a single source to a plurality of output fibers (the preferred embodiment) or to use a single detector with a plurality of sources (the alternate embodiment), the drawbacks associated with past switching devices have been substantially eliminated.

Although this invention has been described with reference to particular embodiments, it will be understood that this invention is also capable of further and other embodiments within the spirit and scope of the appended claims.

I claim:

1. A fiber optic rotary switching device, comprising:
   means for securing a plurality of optical fibers in predetermined spaced apart relationship with respect to each other;
   a single optical fiber having a first end and a second end, said single optical fiber being positioned adjacent said plurality of optical fibers;
   rotatable means interposed between said plurality of optical fibers securing means and said single optical fiber for mounting said first end of said single optical fiber thereto for movement therewith in such a manner that said single optical fiber flexes with respect to said second end thereof yet is prevented from twisting as said rotatable optical fiber mounting means rotates; and
   means operably connected to said rotatable optical fiber mounting means for rotating said optical fiber mounting means to a plurality of predetermined positions in which said first end of said single optical fiber is optically aligned with a preselected one of said plurality of optical fibers.

2. A fiber optic rotary switching device as defined in claim 1 further comprising means operably associated with said rotatable optical fiber mounting means in order to monitor the position of said single optical fiber as said rotatable optical fiber mounting means rotates to said plurality of predetermined positions.

3. A fiber optic rotary switching device as defined in claim 1 further comprising means interposed between said plurality of optical fibers securing means and said rotatable optical fiber mounting means for preventing extraneous light from entering all except said preselected one of said plurality of optical fibers which is optically aligned with said single optical fiber.

4. A fiber optic rotary switching device as defined in claim 1 wherein said rotatable optical fiber mounting means comprises a disk-like plate, means fixedly secured to said first end of said single optical fiber, and means positioned on said disk-like plate for encompassing said single optical fiber securing means in such a manner as to enable said optical fiber securing to move freely therein.

5. A fiber optic rotary switching device as defined in claim 4 wherein said encompassing means is in the form of a ferrule housing and said securing means is in the form of a ferrule.

6. A fiber optic rotary switching device as defined in claim 2 wherein said means for monitoring the position of said single optical fiber comprises a plurality of openings of preselected configurations situated adjacent the outer periphery of said rotatable optical fiber mounting means and means for detecting the presence of said plurality of openings in order to ascertain the position of said single optical fiber.

7. A fiber optic rotary switching device as defined in claim 1 wherein said means for rotating said rotatable optical fiber mounting means comprises a stepper motor.

8. A fiber optic rotary switching device as defined in claim 1 wherein said second end of said single optical fiber is connected to a light source.

9. A fiber optic rotary switching device as defined in claim 1 wherein said second end of said single optical fiber is connected to a light detector.

10. A fiber optic rotary switching device as defined in claim 3 wherein said light preventing means comprises a gasket secured to said rotatable optical fiber mounting means, said gasket having a single opening therein juxtaposed said first end of said single optical fiber.

11. A fiber optic rotary switching device as defined in claim 3 wherein said light preventing means comprises a gasket secured to said plurality of optical fibers securing means, said gasket having a plurality of openings therein, each of said openings being aligned with a respective one of said plurality of optical fibers.

12. A fiber optic rotary switching device as defined in claim 6 wherein said means for monitoring the position of said single optical fiber further comprises a light source optically aligned with at least one of said openings of said preselected configurations in order to pass said light therethrough and a light detector positioned to receive said light passing through said openings of preselected configurations, said detector providing a signal representative of said position of said single optical fiber.

13. A fiber optic rotary switching device as defined in claim 2 further comprising means interposed between said plurality of optical fibers securing means and said rotatable optical fiber mounting means for preventing extraneous light from entering all except said preselected one of said plurality of optical fibers which is optically aligned with said first end of said single optical fiber.

14. A fiber optic rotary switching device as defined in claim 4 wherein said plurality of optical fibers securing means comprises a housing having a face plate, said face plate having a plurality of spaced apart holes therein, each of said plurality of optical fibers being secured within one of said plurality of holes, respectively, and said face plate being positioned juxtaposed said disk-like plate such that each of said plurality of holes are capable of being optically aligned with said first end of said single optical fiber.

15. A fiber optic rotary switching device as defined in claim 13 wherein said rotatable optical fiber mounting means comprises a disk-like plate, means fixedly secured to said first end of said single optical fiber, and means positioned on said disk-like plate for encompassing said single optical fiber securing means in such a manner as to enable said optical fiber securing to move freely therein.

16. A fiber optic rotary switching device as defined in claim 15 wherein said means for monitoring the position of said single optical fiber comprises a plurality of openings of preselected configurations situated adjacent the outer periphery of said rotatable optical fiber mounting means and means for detecting the presence of said plurality of openings in order to ascertain the position of said single optical fiber.

17. A fiber optic rotary switching device as defined in claim 16 wherein said light preventing means comprises a gasket secured to said rotatable optical fiber mounting means, said gasket having a single opening therein juxtaposed said the first end of said single optical fiber.

18. A fiber optic rotary switching device as defined in claim 16 wherein said light preventing means comprises a gasket secured to said plurality of optical fibers securing means, said gasket having a plurality of openings therein, each of said openings being aligned with a respective one of said plurality of optical fibers.

19. A fiber optic rotary switching device as defined in claim 16 wherein said means for monitoring the position of said single optical fiber further comprises a light source optically aligned with at least one of said openings of said preselected configurations in order to pass said light therethrough and a light detector positioned to receive said light passing through said openings of preselected configurations, said detector providing a signal representative of said position of said single optical fiber.

20. A fiber optic rotary switching device as defined in claim 19 wherein said means for rotating said rotatable optical fiber mounting means comprises a stepper motor.

* * * * *